Patented Nov. 5, 1946

2,410,417

UNITED STATES PATENT OFFICE 2,410,417

VITAMIN AND MINERAL DIETARY SUPPLEMENT AND METHOD OF MAKING

Carl N. Andersen, Wellesley, Mass., assignor to Lever Brothers Company, Cambridge, Mass., a corporation of Maine No Drawing. Application March 4, 1944, Serial No. 525,101

7 Claims. (Cl. 167—81)

The present invention relates to dietary supplements and their preparation, which are intended to be used to counteract or to avoid the effects of dietary deficiencies. More particularly, the invention may be utilized to provide compositions which contain in one preparation both mineral and vitamin substances in a readily assimilable form, and which at the same time are adequately protected against deterioration and loss of potency over long periods of time.

It is well known that an average person requires for complete health a certain minimum of mineral and vitamin substances, all of which occur naturally in various foods. The most important among these substances are the minerals, such as calcium, phosphorus and iron, and the vitamin substances, such as vitamin A, vitamin B complex (thiamin or its hydrochloride, riboflavin, nicotinic acid or nicotinamide, pyridox, pantothenic acid, choline, inositol p-aminobenzoic acid, biotin, chondroitin and other chemically unidentified factors), vitamin C (ascorbic acid) and vitamin D. Other vitamin substances include vitamin E (alpha-tocopherol), vitamin K and a number of others of less significance from a dietary point of view. In general, the vitamins can be divided into two groups: (1) the oil-soluble vitamins which include A, D, E and K among the more common vitamins, and (2) the water-soluble vitamins which include the remainder of those identified above.

Although it is possible to acquire the necessary amounts of all of these materials in a well regulated diet, it is well established that a relatively large number of persons do not receive amounts which are regarded as the minimum for complete health. For this reason dietary deficiencies frequently occur.

Much progress has been made in alleviating dietary deficiencies as a result of the isolation or concentration or both of the several vitamin substances which now are readily available commercially, alone or in various admixtures. The minerals essential to preferred diet also are available in tablet or other form, although they have not met with great commercial success, possibly because the importance of these elements in the diet has not been generally appreciated. As a result, diets are frequently supplemented with one or more vitamin substances, often without regard to the proper balance between them, and generally without any mineral additions, even though it is well established that the use of vitamin and mineral substances as a dietary supplement, at least as to certain ingredients, should be carefully balanced.

Many of the vitamin substances, both as they occur naturally and in pure or concentrated commercial forms, are unstable and the preparation of these materials in a stable form for ordinary uses has been subject to much difficulty. For example, many of the vitamins are deleteriously affected by the oxygen of the air or moisture or both, by acids or alkalies, by other vitamins or by minerals.

The difficulties encountered in providing a single composition containing both minerals and vitamins that are stable, it is believed, reside in the fact that the vitamin substances are subject to rapid destruction for a number of reasons. Oxidation upon contact with air and upon contact with water containing air is one cause of the deterioration. The presence of minerals in contact with the vitamins, perhaps because of catalytic action, causes deterioration or destroys the vitamin substances. The admixture of minerals with vitamins also renders it more difficult to exclude air or moisture from the vitamins both in admixture within the preparation and in contact with the exterior. As a further illustration, certain vitamins affect other vitamins when in contact with each other. Also some vitamins are better preserved in one environment while others remain more stable in another environment. No attempt has been successful heretofore to avoid, to a material degree, the destructive influences present when vitamins or vitamins and minerals are in intimate contact or admixture over long periods of time, such as when present in a single homogeneous preparation.

There has long been a demand in the art for a single composition containing in a stable form both vitamin and mineral components. The advantages of such a preparation are readily apparent, for example, both with respect to the convenience in administering the same and the avoidance of unbalanced usage.

It has been suggested heretofore that the vitamin and mineral substances could be put in a single alimentary preparation, but such suggestions have not solved the difficulties described heretofore, and such attempts have not met with success inasmuch as in such preparations some of the vitamin ingredients undergo deterioration and destruction. It is of particular significance that it is common practice to provide minerals and vitamins in two separate tablets or capsules, one containing vitamins and the other containing minerals. This involves the problem of inconvenience in administering and the susceptibility to careless usage. There was no assurance, for example, that a person would take both preparations, or take them in the related amounts prescribed. At times the supply of one preparation might become exhausted or misplaced and not resupplied at once.

In accordance with the present invention the vitamins and minerals are combined in a single preparation, preferably in tablet form, which is readily taken and assimilated, and at the same time is adequately protected against loss of potency of all of the ingredients over long periods of time. The ingredients of the composition are preferably present in a substantially uniform or homogeneous admixture which can be placed in a tablet form in which each ingredient is distributed throughout the tablet with substantial uniformity. The mixtures may be formed into tablets by the simple and convenient methods currently available for pressing or "stamping" the tablet. This is of significance in that it permits the use of an inexpensive and simplified tablet making technique, which makes the product available to the public at a much lower cost than heretofore.

The present invention is predicated upon the discovery that the incompatible vitamins and the incompatible vitamins and minerals when intimately admixed in a single homogeneous composition may be rendered innocuous to each other, and at the same time the vitamin content may be adequately protected against the destructive action of air and moisture. The invention includes the provision of a protective separation or isolation of the ingredients in such a composition which are susceptible to destruction by contact with the remaining substances in the preparation, or by separating or isolating the particular ingredients which have a destructive influence on the remaining ingredients, or both. Thus one of the destructive influences arising within the tablet is overcome. The invention also includes the combination of the above features with the protection of the individual ingredients in such a composition when necessary, as well as the entire composition, from other destructive influences, such as air and moisture, which might otherwise be present within the composition or attack it from the outside. Included in the invention is the discovery of a method for accomplishing the above-described separation or isolation of the ingredients and protection of them separately and in admixture as a composition from the various destructive influences.

The present invention is not particularly concerned with the preparation of the vitamin and mineral ingredients per se which are utilized in forming the composition of the present invention. It is intended that any readily available commercial source of such ingredients, or any that are developed in the future, may be utilized.

In carrying out the invention, the vitamins may be utilized in a pure or commercially available concentrated form or, in place thereof, there may be utilized derivatives or materials having a high content of the vitamin substances desired and which can be utilized as the equivalent of the usual commercial concentrate. The terms vitamins are intended to include all such equivalents which are well known in the art. The invention is, however, particularly adapted for use in connection with synthetically formed vitamins which are more labile because they are in the pure state. They present somewhat different problems than the naturally occurring vitamins such as the vitamin B in yeast cells.

With respect to the minerals, the calcium and phosphorus is provided primarily and preferably in the form of a calcium-phosphorus salt. Any such salt may be used, such as mono-, di- or tri-calcium orthophosphate, or calcium pyrophosphate. It is understood, of course, that less desirable compounds containing calcium or phosphorus, or both, or admixtures thereof, may be utilized in forming the preparations of this invention, inasmuch as an indeterminate group of them may have an advantageous therapeutic value.

The iron may be in the form of any iron compound, such as ferrous sulfate, ferrous gluconate and ferric pyrophosphate. If an iron phosphorous compound is used, it permits the inclusion of additional phosphorus to supplement that contained in the calcium-phosphorus salt. Iron sodium pyrophosphate $$(Fe_4(P_2O_7)_3 \cdot 2Na_2P_2O_6 \cdot 7H_2O)$$

has been found suitable for this purpose.

Many studies have been made to determine the extent of dietary deficiencies normally encountered. Resort may be had thereto to determine the preferred ingredients as well as the proportions to be used in forming preparations intended for dietary supplements in accordance with this invention. The recommendations of the National Research Council in Washington may be considered with respect to the dietary requirements of individuals. At the present time vitamins A, C, D and thiamin, riboflavin and nicotinamide of the B complex, are recommended as desirable vitamins to be included. The minerals are calcium, phosphorus and iron. In some instances it may be desirable to add ingredients not specifically mentioned herein, and this also is contemplated as part of the present invention. For example, the inclusion of copper promotes the utilization of the iron. Iodine in the form of potassium, sodium or calcium iodide may be included along with magnesium, manganese, cobalt in a suitable form, as well as brewer's yeast and liver concentrate, and any other natural material rich in vitamins.

As a specific example, based upon readily available reports, it may be intended to provide in conveniently utilizable form, the following daily amounts and proportions of the vitamin and mineral ingredients:

| | Daily ration |
|---|---|
| Vitamin A | 4,000 units |
| Vitamin D | 400 units |
| Vitamin B₁ (thiamin-hydrochloride) | 1.0 mgs. |
| Vitamin B₂ (riboflavin) | 2.0 mgs. |
| Vitamin P-P (nicotinamide) | 10.0 mgs. |
| Vitamin C (ascorbic acid) | 50.0 mgs. |
| Fe₄(P₂O₇)₃·2Na₂P₂O₆·7H₂O | 11.0 mgs. Fe / 15.0 mgs. P |
| Calcium pyrophosphate | 193 mgs. P / 250 mgs. Ca — 208 mgs. P |

The amounts may be increased or decreased as found desirable, and other vitamins or minerals may be added without departing in any way from the invention. For example, the amount of vitamin A may be increased to 6,000 units and vitamin D to 600 units, if desired, and other members of the B complex may be added.

In the above formulation, the amount of calcium may be somewhat lower than required to supply the needs of certain classes of individuals, and if desired the amount of calcium may be increased. In making the tablet, calcium can be included in the coating so as to raise the amount to about 400 mgs., which more nearly approaches the highest amount required to supplement the diet of such individuals.

A mixture of the above ingredients, if made in accordance with the prior art, would be unstable, at least as to certain of the ingredients. In accordance with the present invention, loss of potency of any ingredient may be avoided over long periods of time. This may be accomplished by isolating the substances which are deleteriously affected by the remaining ingredients, or by isolating the substances which deleteriously affect the other ingredients present, or both, preferably while retaining the ingredients in the form of a homogeneous mixture capable of being stamped or pressed into tablets.

For example, it is believed to be essential to separate any iron compounds present, either by isolating the iron or protecting the vitamin bodies from contact therewith. In general, separation or isolation of any of the ingredients may be accomplished, for example, by coating the individual ingredients and, if desired, including the coated particles in a granulation that is to be a part of the final mixture.

In accordance with the present invention, also it is possible to protect the vitamins alone or in any admixture by coating the particles with a protective substance. Among the materials which are particularly adapted to be used for coating purposes are organic solvent-soluble plastic and resinous film-forming materials, such as the alcohol-soluble natural resins, for example copal, myrrh, styrax, benzoin and dammar; cellulose ethers, for example ethyl cellulose; cellulose esters, for example cellulose nitrate and cellulose acetate; polyvinyl compounds, such as polyvinyl alcohol, polyvinyl acetate, polyvinyl chloride-acetate and polyvinyl butyral resins, the phenol-formaldehyde resins, the urea-formaldehyde resins, the phenol-furfural resins, the melamine-formaldehyde resins, and the polybasic alcohol-polybasic acid resins known as "Glyptals." These coating materials are referred to herein as film-forming plastics and are used in a solution of alcohol or other organic solvent, such as hydrocarbon esters and ketones. The solvent should not be harmful to the ingredient to be coated.

Any of the plastics may be used with plasticizers to obtain films of different properties as is well known in the art.

I am aware that it has been proposed heretofore to preserve cod liver oil by a water solution of the water-soluble alcohol-insoluble Karaya gum. This is to be distinguished from the plastics I use and in the manner of use. I am also aware that it has been proposed to preserve cod liver oil by mixing it with melted paraffin or hard fat and absorbing or distributing the mixture in soybean meal, yeast, calcium salts, etc. Paraffin and fat is not a plastic film-forming substance as defined herein, nor are minerals separated from water-soluble vitamins as is possible in accordance with the invention. In addition, paraffin and fats melt at so low a temperature as to melt or soften, in hot climates. The plastics used have a melting or softening point above 120° F. It has also been proposed to coat medicines, such as ferments and enzymes, with acidic coatings to prevent harm to the medicine by the acidic contents of the stomach and to keep it intact until it reaches the intestine. The plastics I use preferably do not contain such acidic groups, so as not to inhibit the availability of the vitamins in the stomach.

The coating may be accomplished, for example, by rapidly stirring a mixture of vitamin C and a cellulose ester or ether in solution in an organic solvent until the particles are thoroughly coated. To facilitate the distribution of the coated particles, a calcium salt may be added which absorbs the coated vitamin C. Alternatively, a mixture of the vitamin and the calcium salt may be treated similarly with the cellulosic solution and will be found similarly to have separately coated the vitamin and salt particles.

It may also be preferred to isolate the vitamins of the B complex in a similar manner, either by coating each vitamin separately, or by coating a mixture of two or more or all of the B vitamins. All of the water-soluble vitamins may be coated in admixture in a single operation, but I prefer to coat them separately, especially vitamins $B_1$ and vitamin C, and calcium pantothenate.

The coating operation may be carried out in a solution in which the solvent is solely an organic liquid or one in which the water content is very small. Thus the vitamin is excluded from contact with moisture, at least in such as amount as would deleteriously affect it during the coating operation.

The exact manner in which the vitamins become coated with the plastic or film-forming material is not fully known, but an understanding of the exact physical relationship of the vitamin in the coating is not believed to be essential to an understanding of the invention and the manner in which it may be practiced. If the vitamin is completely insoluble in the solvent for the cellulosic material it is likely that the individual small particles of the vitamin are coated with a film of the coating material in solution, and that upon evaporation of the solvent, this film remains substantially intact in a dry state surrounding the particles. In the event that the vitamin material is soluble or partially soluble in the solvent for the coating material, it is likely that the dissolved vitamin is co-precipitated with the coating material upon evaporation of the solvent, leaving the vitamin in a very finely divided form, but nevertheless thoroughly embedded in the dry coating material. In either event, it is clear that the coating material surrounds and protects the vitamin in finely divided form, and a reference herein to the "coating" of vitamins is intended to refer to either of the possibilities above described or others of which I am not aware.

The coating material being substantially impervious to air, and moisture, at least in the vapor form, protects the vitamins thus treated against the destructive influence of air and moisture.

Although the vitamins so treated are rendered stable against the destructive influences of moisture in such forms as the tablet would normally encounter prior to consumption, the coating however does not prevent the vitamin from being extracted and utilized by the body. Tests have shown that a vitamin coated in the manner described is released within the body and made available to substantially the same extent as the same amount of the same vitamin would be when administered in the pure form for instance, in a freshly made solution.

As stated above, it is important, in the event that the various vitamin substances are not individually isolated, to isolate the iron, such as by coating the iron compound.

The vitamins A and D, usually in the form of a concentrated oil, need not be separately isolated provided the remaining ingredients have been adequately isolated. If desired, however, it is possible to incorporate the vitamins A and D in a hard fat, such as a stearin or hard monoglyceride, or in a liquid oil, such as corn oil, wheat germ oil, cottonseed oil or sesame oil, in accordance with the prior art. While not equivalent, these vitamins may be incorporated in a film-forming substance such as described. In most instances, however, it is satisfactory merely to admix the vitamin A and D concentrate with the previously formed granulations.

Various materials to function as binders, fillers, etc., may be included for the purpose of rendering the mixture more susceptible to the tablet forming and coating operations. The use of conventional flavoring and sweetening materials also may be desired and may be admixed at any stage with any of the ingredients.

After the individually isolated ingredients are admixed to form a homogeneous admixture, they may be formed into tablets by pressing or stamping in accordance with the conventional techniques employed in the art. After the tablets are formed, they may have one or more coatings applied to fill any voids in the tablet and displace any air in the tablet, as well as to form coatings protecting the entire tablet against moisture and oxygen in the air. In general, the coatings may consist of moisture-proof materials, such as any of the coating materials of the type described above and shellac separately or in admixture. While the coating prevents the entire tablet from contact with any moisture in the vapor form, X-ray tests have shown that the coatings do not prevent the relatively rapid disintegration of the tablet in the alimentary canal and the complete utilization of the ingredients.

Subsequent coatings may include materials for adding weight and body to the finished tablets including a calcium compound for increasing the total amount of calcium in the tablet. In the conventional manner it is preferred to utilize at least one of the usual sugar coatings and the outer surface preferably is polished with wax in a conventional manner.

As a specific example of the formation of an adequately stabilized composition containing both vitamins and minerals resort may be had to the following description. It is to be understood, however, that this example is given merely to assist in the understanding of the invention and is not intended to be a limitation thereof.

In making the tablets it is possible to include the daily ration in one tablet or in a plurality. For convenience only, the illustrative example will have the daily ration divided into three tablets. This makes the tablets sufficiently small to be swallowed without chewing, if so desired, and permits them to be taken at several times during the day, for example, at or near each meal. Also, if a person believes that his diet supplies nearly all of the minimum requirements he may desire to take only one-third of the minimum daily ration. The relative amounts, however are not critical as stated before and are given only to illustrate an application of the invention.

In the case of certain of the ingredients it is desirable to include a somewhat larger amount than the daily ration at the time of manufacture in order to allow for manufacturing loss and to assure the presence of the amount supposed to be contained in the tablet when it reaches the consumer irrespective of the history of the tablet after it leaves the hands of the manufacturers. While the invention stabilizes the vitamins so that a minimum of overage is necessary, it may be desirable to include a small amount of overage in the case of some ingredients. In others, for example the minerals, where no deterioration is even theoretically possible, no overage need be included. In the specific example, the amounts specified are without overage. The manufacturer may increase any of the vitamins by such amount as he feels is desirable under the circumstances. In general, a 10 to 20% overage of all of the vitamins would be adequate to cover all ordinary contingencies.

In the following description the amounts used are those required to make a million tablets, each having one-third of the daily ration noted above.

*Ascorbic acid coating and granulation*

|  | Kilos |
|---|---|
| Ascorbic acid | 16.666 |
| Calcium pyrophosphate | 27.216 |
| Ethyl cellulose dissolved in ethyl alcohol to make a 10% solution | 1.814 |

The ascorbic acid is placed in a mixer and agitation is begun whereupon one-half of the ethyl cellulose solution is added or a sufficient amount of ethyl cellulose solution to coat the vitamin very thoroughly. After thorough mixing, the calcium pyrophosphate and the balance of the ethyl cellulose solution are gradually added alternately and mixing is continued, for example, for about fifteen minutes until a uniform mixture results. The mixture is agitated while the ethyl alcohol is evaporated. Heat and a vacuum may be used to assist the removal of the alcohol. Agitation is continued throughout and for a sufficient length of time thereafter to ensure complete dryness. The material thereupon may be screened through a 20-mesh screen to form a granulation and placed in storage for use.

In this operation the initial mixing of the vitamin and the cellulose coats the vitamin. The addition of the calcium pyrophosphate is used primarily as a means of distributing the coated vitamins in a large mass in such a manner that they can be admixed uniformly with the other parts of the composition. The additional amount of the cellulosic solution added after coating facilitates the formation of a compact granulation.

In place of ethyl cellulose any other cellulosic material may be used and any suitable solvent for the cellulosic material may be used. The amounts are not critical and may be varied as desired. The amount of the phosphate may be increased or decreased, but if altered, a proportionate change in the amount of the phosphate introduced at some other stage may be necessary to achieve the desired amount in the tablet.

*The B complex coating and granulation*

|  | Kilos |
|---|---|
| Nicotinic acid amide | 3.333 |
| Thiamine-hydrochloride | .333 |
| Riboflavin | .666 |
| Saccharin | 1.048 |
| Talc | 16.000 |
| Calcium pyrophosphate | 27.216 |
| Ethyl cellulose in ethyl alcohol to make a 10% solution | 1.814 |

The vitamin B complex ingredients are preliminarily ground in a ball mill with the talc. The latter is included merely to facilitate grinding. To the mixture is added approximately half of the ethyl cellulose solution and agitation is carried out until the ingredients are thoroughly coated. Following this operation the calcium pyrophosphate and the remainder of the ethyl cellulose solution are added and agitation is continued until a uniform mixture results. Thereupon the product is dried under vacuum at about 170° F. to remove the ethyl cellulose solvent vapors. The material is screened through a 20-mesh sieve to form a granulation and stored until used.

The observations relative to the action taking place at the various stages and the ingredients and amounts noted previously in connection with ascorbic acid are similarly applicable here.

In an alternative method, all of the ingredients of the B complex formulation above noted, except the ethyl cellulose, are ground to a uniform mixture and stored for use. In this alternative method the B vitamins are not coated and in some embodiments of the invention this is not necessary if the other means of achieving isolation and protection are utilized.

*Iron coating and granulation*

| | Kilos |
|---|---|
| Sodium iron pyrophosphate | 21.333 |
| Ethyl cellulose dissolved in ethyl alcohol to make a 5% solution | .907 |
| Calcium pyrophosphate | 27.216 |

The sodium iron pyrophosphate is added to a mixer and coated with the ethyl cellulose solution as described above in connection with the foregoing granulations. After thorough coating, the calcium pyrophosphate is added gradually, and agitation is continued until mixing is complete. The resulting moist material is subsequently passed through an oscillating granulator and dried at 160° F. in air. The material may be sieved through a 60-mesh screen and stored for use.

The observations as to the actions taking place at the various stages, as well as the ingredients used on their amounts noted above in connection with the B and C granulations are also applicable to the iron granulation.

*Iron-calcium-gelatin granulation*

| | Kilos |
|---|---|
| Calcium pyrophosphate | 184.3 |
| Coated iron granulation (described above) | 49.456 |
| Water-soluble binder dissolved in water to make 24 gallons | 20 |

The calcium pyrophosphate and coated iron granulations are added gradually with the binder solution to a mixer until all of the materials have been added. The final product is a caky and cohesive mass, and may be passed through an oscillating granulator and dried in an oven at 160° F. In the final step the material is passed through a 20-mesh sieve and thereupon is stored for processing.

The binder is included so that the tablet will hold together during the stamping and coating operations. The amount used and the amount of water used are not critical as long as the desired result is obtained.

The amount of calcium pyrophosphate is that necessary, in addition to that used in the previously described granulations or mixtures, to achieve the desired amount of calcium in the complete mixture.

If desired, the iron may not be included in this granulation in which event only the calcium pyrophosphate and the binder would be granulated. The preferred method described, however, has several advantages from the procedural standpoint.

All of the above ingredients, granulations or mixtures, depending on exact method selected for processing the various ingredients, are placed in a mixer from which the air may be evacuated. All of the materials are thoroughly mixed. After initial mixing and during continued mixing, the oil-soluble vitamins, such as A and D, in the form of a concentrate or in an oil, are sprayed over the granulation. If desired, the concentrate may be applied to one or a mixture of two or more granulations and the remaining materials then added. The addition of the concentrate in the preferred manner, however, has the advantage of obtaining a thorough mixture during the addition.

Flavoring material may also be added, before, after, or during the addition of the concentrate.

The complete mixture is then ready for stamping into tablets. In the specific illustrative example the amount in each tablet would be adjusted so as to make a million tablets.

The completed tablets are given a series of protective coatings. The first of these coatings may comprise a solution of a cellulose ester or ether, such as ethyl cellulose or collodion. If the tablet has any voids into which air may penetrate, the coating penetrates into such voids thereby eliminating and excluding air.

Although this material resists air and moisture, as has been pointed out heretofore, X-ray analysis shows that the coating is sufficiently penetrated under conditions prevailing in the alimentary canal to permit disintegration of the tablet and the release of all of its constituents for utilization by the body. The second coating may consist of a cellulosic solution with which a vegetable shellac has been mixed. This second coating may be repeated any number of desired times, for example four additional coats have been found to be desirable. The substitution of a part of the cellulosic material by shellac is desirable from the dietary point of view, but either may be used. It is desirable to dust each of the coatings with a calcium salt in order to facilitate the coating. This also permits the inclusion of a larger amount of calcium in the tablet.

If desired, one or more of the coatings may be dusted with an acidic material or with a calcium compound containing the same, such as for example, citric acid.

Following the coatings with cellulosic material and shellac, it may be desirable to coat the tablets with a gelatin and sugar solution as is conventional in the tablet coating art.

Following this treatment the tablets may be waxed with a solution of wax in a suitable volatile solvent to provide a polished surface, as is conventional in the tablet coating art.

Although the use of antioxidants and other additional agents is not necessary in forming the tablets of the present invention, it is to be understood that the use of such materials is not excluded.

As illustrative of the effectiveness of the protection against loss of potency afforded by the coating of ethyl cellulose, vitamin tablets were prepared following the general technique described above, including the application of a final sugar coating. Immediately upon their completion the vitamin tablets were analyzed by conventional quantitative analysis techniques to determine the vitamin A content as expressed in U. S. P. units, and the vitamin $B_1$, vitamin C, vitamin B₂ and nicotinamide content as expressed in milligrams. This is referred to as the preliminary assay. These tablets were then stored in an oven at a temperature of 42° C. in accordance with a well developed accelerating aging test which by comparison with analysis of tablets obtained from the field show that three weeks at 42° C. is equivalent to ten to eleven months of shelf life, for the least stable vitamin. The tablets were tested at different intervals during the test and the following results are an average of many such tests:

Table IA

|  | Vitamin A in U. S. P. units | Vitamin B₁ in mgs. | Vitamin C in mgs. | Vitamin B₂ in mgs. | Nicotinamide in mgs. |
|---|---|---|---|---|---|
| Preliminary assay | 2,001 | 0.41 | 11.12 | 0.71 | 4.00 |
| 3d week at 42° C | 1,996 | 0.36 | 9.52 | 0.71 | 3.99 |
| 5th week | 1,895 | 0.33 | 9.41 | 0.71 | 3.99 |

The same tablets were collected after being on a drug store shelf for eleven months and the average of the results are:

Table IB

|  | Vitamin A in U. S. P. units | Vitamin B₁ in mgs. | Vitamin C in mgs. | Vitamin B₂ in mgs. | Nicotinamide in mgs. |
|---|---|---|---|---|---|
| Preliminary assay | 2,015 | 0.41 | 11.21 | 0.72 | 4.06 |
| Field sample (age 11 mos.) | 2,078 | 0.369 | 10.34 | 0.69 | 4.25 |

In the conventional quantitative analysis of the vitamins as set forth above, the results vary but are accurate within a range of about 10%. As a result of these variations, the analysis of any ingredient present may appear in some instances to show an increase. As a practical matter, the variations in each instance are so small in amount that they fall within the limitations of the best recognized technique of analysis and thus demonstrate that any loss of potency of the vitamins has been too small in amount to be measured quantitatively. It is generally recognized that of the water-soluble vitamins, vitamin B₁ and vitamin C are the least stable and the most difficult to protect against loss of potency. Nevertheless, as shown in the above table, these vitamins which have been coated in accordance with the invention are rendered stable under accelerated stability tests.

Although the film-forming materials which may be utilized in carrying out the present invention are air and water impervious and thus protect the vitamin against contact with air, moisture and other undesirable influences, nevertheless, the vitamins are readily available when taken internally. It can be shown by tests of the type herein described that the vitamin is utilized to the same extent as a pure vitamin having no coating whatever, and the coating is a harmless and innocuous ingredient of medicinal and dietary preparations. The film-forming materials of the character described are substantially inedible and inert and probably are unaffected chemically during passage through the digestive tract. Nevertheless the vitamins are effectively freed from the insoluble coating in the digestive tract as shown by tests to be described hereinafter and thus are available. It is possible that the protective coating may be disrupted or mechanically or otherwise broken in the digestive tract whereupon the vitamins are free to be absorbed, or they may be removed through some osmotic action. It is not believed to be essential to an understanding of the invention to define the manner in which the vitamins are freed in the digestive tract from the protective coating and the above theory is intended to be given merely as a possible explanation of the action of the protective coating and is not to be construed as a limitation upon the scope of the invention.

The following tests show, for example, the availability of thiamin protected with ethyl cellulose in accordance with the above illustrative embodiment of the invention. It is to be understood that these tests are merely illustrative and that similar results may be obtained with other soluble vitamins or with coatings of other film-forming substances of the character herein described.

In carrying out the tests, the subjects were given a daily diet which furnished approximately 825 micrograms of thiamin, i. e., about that characteristic of the daily diet of the average American. Approximately 25 micrograms were furnished by breakfast, and about 400 micrograms by each of the subsequent two meals.

Urine collections were made throughout the day and analysed for thiamin content. The methods used and the significance of the tests for demonstrating the utilization of thiamin are set forth by Melnick, Field and Robinson in "The Journal of Nutrition," vol. 18, No. 6, December 1939. The following table (Table II) shows the results obtained with a typical subject:

Table II

| Dietary thiamin intake | Time of urinary collection | Thiamin excreted |
|---|---|---|
| Micrograms ¹ 825 | Hours 24 | Micrograms 175 |

¹ A rough approximation drawn from reported values for food ingested.

On the second day, immediately after dinner, 5,550 micrograms of thiamin coated with ethyl cellulose in accordance with the present invention, was administered. Twenty-four hour urine samples were collected and analyzed as before for thiamin content. The following table (Table III) shows the results obtained during the feeding of the ordinary diet plus the addition of thiamin coated in accordance with the present invention. The thiamin excreted from the tablet was calculated by subtracting the amounts shown in Table II as excreted from the dietary intake, from the total amount excreted.

Table III

| Thiamin intake | | Thiamin excreted | | |
|---|---|---|---|---|
| Dietary | Coated | Time of urinary collection | Total | From coated thiamin |
| Micrograms 825 | Micrograms 5,550 | Hours 24 | Micrograms 825 | Micrograms 677 |

The above test was then repeated except that the additional thiamin was given in the form of a pure solution. The following table (Table IV) shows the results obtained when the thiamin was administered in the form of a pure solution:

Table IV

| Thiamin intake | | Time of urinary collection | Thiamin excreted | |
|---|---|---|---|---|
| Dietary | Pure solution | | Total | From pure solution |
| | | Hours | | |
| [1] 825 | [1] 5,000 | 24 | [1] 915 | [1] 747 |
| [1] 825 | [1] 5,000 | 24 | [1] 1,002 | [1] 802 |

[1] Weight in micrograms.

The results obtained closely approximate the test results reported by Melnick, Field & Robinson, supra.

The above tests indicate that thiamin which is protected with a coating of a film-forming water-impervious substance is as readily utilized as a test dose in pure aqueous solution. This may best be shown by comparing the results obtained by feeding extra thiamin in pure solution form and in coated form. The following table (Table V) is compiled from Tables III and IV above:

Table V

| Dietary thiamin intake | Quantity of extra thiamin taken | Form | Thiamin excretion | | | |
|---|---|---|---|---|---|---|
| | | | Before dosage | After dosage | From dosage | Fraction of extra dose excreted |
| | | | | | | Per cent |
| [1] 825 | [1] 5,550 | Coated | [1] 175 | [1] 852 | [1] 677 | 12 |
| [1] 825 | [1] 5,000 | Pure solution. | [1] 168 | [1] 915 | [1] 747 | 15 |
| [1] 825 | [1] 5,000 | ...do... | [1] 200 | [1] 1,002 | [1] 802 | 16 |

[1] Weight in micrograms.

Within the limits of precision of the tests carried out, it is clearly shown that the thiamin coated in accordance with the present invention is utilized to the same extent as thiamin which is administered in the form of a pure solution.

The rate of urinary excretion of thiamin content, following the ingestion of the coated particles, moreover, indicates an unobvious and unexpected advantage of feeding thiamin in the form of coated particles or granules as compared with thiamin in natural form inasmuch as the utilization of the thiamin is caused to take place over a longer period of time. In the foregoing tests when extra thiamin was administered in the coated form, the diurnal variation in the amount of thiamin excreted was as follows:

Table VI

| Thiamin intake | | Time | Time of urinary collection | Thiamin excreted from coated form |
|---|---|---|---|---|
| Dietary | Coated | | | |
| [1] 400 | [1] 5,550 | 1:00 p. m. | 1 p. m.-5 p. m. | 154 |
| | | | 5 p. m.-9 p. m. | 304 |
| [1] 400 | | 6:30 p. m. | 9 p. m.-1 a. m. | 120 |
| | | | 1 a. m.-5 a. m. | 50 |
| [1] 25 | | 8:15 a. m. | 5 a. m.-9 a. m. | 29 |
| | | | 9 a. m.-1 p. m. | 20 |
| | | | | 677 |

[1] Weight in micrograms.

The above results show that the greatest amount of thiamin utilization occurred during the second four hour period and that the utilization was extended over a long period of time. The total amount of thiamin utilized is greater when the vitamin is available for a greater period of time and at a more uniform rate. It has been suggested to increase the utilization of thiamin by feeding at more frequent intervals, but the disadvantages of utilizing this method are apparent. Prior to the present invention it has not been appreciated that the utilization of the vitamin could be increased by modifying the physical form of the vitamin administered.

To further illustrate that water-soluble vitamins which have been coated in accordance with the present invention and thus rendered stable against substantial loss of potency, are utilizable to substantially the same degree as vitamins which have not been coated, specific biological assays were made on tablets containing vitamin $B_1$ (thiamin hydrochloride), vitamin $B_2$ (riboflavin), and vitamin C (ascorbic acid), coated in accordance with the examples given above. The technique employed in biological assays is to feed one group of test animals (rats or pigs) under standard conditions with the coated vitamins and a second group of rats or pigs with an equal amount of uncoated vitamins under the same test conditions. By comparing the test results, for example, with respect to weight increase appearance, autopsy findings, and disease symptoms, it can be determined whether or not the coated vitamins have been utilized to the same extent as the uncoated vitamins. These tests are known to the art and are believed to be conclusive within limits as to whether specific utilizable amounts of vitamins are present in the material tested. The biological assay with respect to vitamin C, for example, was carried out in accordance with the technique of Coward and Kassner, using the International Standard of Reference. The biological assay with respect to vitamin $B_1$, for example, was carried out in accordance with the method described in the U. S. Pharmacopoeia XI (second supplement).

The tablets were tested at the level of 520 micrograms of vitamin $B_2$, 130 USP units of vitamin $B_1$ and 374 international units of vitamin C which were the actual amounts of the vitamins present in the tablets. In the biological assays for each of these vitamins, these amounts were found to be not only present but utilizable.

As an additional example of the application of the invention, the following formulation may be used in making 5000 tablets, each containing one-third of the daily ration.

A solution of polyvinyl acetate is made by dissolving 1½ pounds of polyvinyl acetate in a gallon of alcohol and this is used as the coating solution in accordance with this example.

The vitamin C granulation is made by mixing 50 grams of vitamin C with 37½ grams of calcium pyrophosphate. To this is added 44 grams of the polyvinyl acetate coating solution and as this mixture is stirred it breaks into small wet granules and the vitamin particles and the calcium pyrophosphate particles become thoroughly impregnated and each separately coated with the polyvinyl acetate film. To this mixture is added 37½ grams of calcium pyrophosphate which absorbs the excess solvent and forms a dry-appearing granulation which is passed through a 10-mesh screen and dried. After evaporation of the solvent, the granulation is passed through a 40-mesh screen.

The vitamin $B_1$ granulation is made by mixing 1.66 grams of vitamin $B_1$ with 115 grams of calcium pyrophosphate. To this is added 44 grams of the above described solution of polyvinyl acetate in alcohol. During this mixing the vitamin particles become coated with the polyvinyl acetate and when the coating is complete, 75 grams of calcium pyrophosphate is added which dries the mixture sufficiently to be passed through a 10-mesh screen. After evaporation of the alcohol the granulation is passed through a 40-mesh screen.

In this embodiment of the invention the vitamin $B_2$ and the nicotinamide are not coated since they are sufficiently stable when not in contact with the other coated ingredients. This mixture is prepared by mixing 3.33 grams of vitamin $B_2$ with 18.35 grams of nicotinamide, to which is added 5¼ grams of saccharine as a flavor, and 154 grams of calcium pyrophosphite. This is thoroughly mixed into the form of a uniform fine powder.

The iron granulation is prepared by mixing 70 grams of calcium pyrophosphate with 107 grams of sodium iron pyrophosphate to which is added about 50 grams of the polyvinyl acetate in alcohol solution. The mixing is continued until the iron is thoroughly coated, following which the excess liquid is taken up by the addition of 72 grams of calcium pyrophosphate. This is granulated, dried and further granulated in the same manner as described above.

For the purpose of placing additional calcium in the tablet, 1070 grams of calcium pyrophosphate is mixed with a solution of 80 grams of gelatin in 200 grams of water. This is passed through a 10-mesh screen, dried and put through a 20-mesh screen. The gelatin is not used as a protective or separating material but rather for the purpose of conglomerating the calcium pyrophosphate so as to be in the form of free-flowing discrete granules which will flow properly in the later stamping operation.

The above five granulations and mixtures, that is, the vitamin C granulation, the vitamin $B_1$ granulation, the vitamin $B_2$ and nicotinamide mixture, the iron granulation, and the calcium pyrophosphate granulation are thoroughly mixed and to this is added a vitamin A and D containing oil in an amount to provide 8,335,000 units of vitamin A and 833,000 units of vitamin D. This is mixed thoroughly to distribute the oil in the mixture of the granulations. Flavor may also be added. The mixture is then fed to a conventional stamping means and stamped into 5000 tablets. Following this the tablets are coated with poylvinyl acetate solution and may then be coated with sugar, wax or other conventional procedures for improving the appearance and palatability.

In the above examples, the amounts of all of the vitamins may be increased by what is known as "overage" in order to assure the claimed potency despite any deterioration caused by abnormal conditions after the tablets leave the hands of the manufacturer. In accordance with the invention it is possible to guarantee the claimed potency with the use of a minimum amount of overage.

As indicative of the stability of the vitamin made in accordance with the above illustrated embodiment of the invention, utilizing polyvinyl acetate as a film-forming material, the tablets made were analyzed as soon as completed (preliminary assay) to determine the vitamin A content, expressed in U. S. P. units, and the vitamin $B_1$, vitamin C, vitamin $B_2$ and nicotinamide, expressed in milligrams. The tablets were then subjected to an accelerated aging test in an oven at 42° C. and the tablets were analyzed at different intervals during this period. The results are as follows:

*Table VII*

|  | Vitamin A in U. S. P. units | Vitamin $B_1$ in mgs. | Vitamin C in mgs. | Vitamin $B_2$ in mgs. | Nicotinamide in mgs. |
|---|---|---|---|---|---|
| Preliminary assay | 1,940 | 0.49 | 11.4 | 0.71 | 3.78 |
| 1st week at 42° C | | 0.46 | 11.7 | | |
| 2d week | | | | | |
| 3d week | 1,720 | 0.42 | | | |
| 4th week | | 0.38 | | 0.70 | 3.69 |
| 5th week | 1,800 | 0.37 | 11.6 | | 3.69 |

It will be seen that in the above example the stability is maintained as a result of the coating operation. Particularly is this true in the case of vitamin C, which is one of the most difficult of the vitamins to maintain. The stability of vitamin $B_1$ levels off after some slight deterioration, but it may be retained in the claimed potency for well over a year without the use of excessive overages.

As indicative of the availability to man of the vitamin $B_1$ in the tablets made as above described, using polyvinyl acetate as the coating material, six individuals were subjected to tests in accordance with the procedure described previously. In particular, the basal vitamin $B_1$ excretion was determined and the increased excretion was determined after the administration of 5 milligrams of vitamin $B_1$ in aqueous solution. This was compared with the increase following the administration of 15 tablets prepared as above described.

While the results are not exactly comparable because of the fact that slightly more vitamin $B_1$ was administered in the form of tablets than in the pure solution, percentagewise the data shows that substantially all, or at least 90%, of the vitamin $B_1$ in the tablets is available. The data is as follows:

*Table VIII*

| Subject | Pure solution, 5 mg. thiamine | | | 15 Tablets, 7.2 mg. thiamine | | |
|---|---|---|---|---|---|---|
| | Basal | After test dose | Per cent of test dose excreted | Basal | After test dose | Per cent of test dose excreted |
| | Mcg./day | Mcg./day | | Mcg./day | Mcg./day | |
| M. H. | 207 | 1,216 | 20 | 396 | 2,002 | 22 |
| D. M. | 245 | 1,095 | 17 | 385 | 2,111 | 24 |
| J. C. | 158 | 873 | 14 | 376 | 2,083 | 24 |
| E. M. | 186 | 808 | 12 | 210 | 1,537 | 18 |
| H. H. | 193 | 1,127 | 19 | 444 | 2,006 | 22 |
| L. S. | 314 | 1,234 | 18 | 227 | 1,850 | 23 |
| Average | 217 | 1,059 | 17 | 340 | 1,932 | 22 |

A similar test was made to determine the availability to man of ascorbic acid in tablets made in accordance with the above example utilizing poylvinyl acetate as the coating material. The test was performed in the same manner and the results are as follows:

Table IX

| Subject | Pure solution, 200 mg. ascorbic acid | | | 15 tablets, 179 mg. ascorbic acid | | |
|---|---|---|---|---|---|---|
| | Basal | After test dose | Per cent of test dose excreted | Basal | After test dose | Per cent of test dose excreted |
| | Mcg./day | Mcg./day | | Mcg./day | Mcg./day | |
| M. H | 17 | 84 | 34 | 33 | 117 | 47 |
| D. M | 14 | 105 | 46 | 27 | 113 | 48 |
| J. C | 18 | 87 | 35 | 32 | 91 | 33 |
| E. M | 17 | 118 | 51 | 17 | 115 | 55 |
| H. H | 16 | 138 | 61 | 15 | 90 | 42 |
| L. S | 28 | 136 | 54 | 26 | 102 | 42 |
| Average | 18 | 111 | 47 | 25 | 105 | 45 |

This data demonstrates that the ascorbic acid similarly is available.

Toxicity studies were made to determine any possible deleterious effects of polyvinyl acetate. These studies were made on albino rats which were fed daily with polyvinyl acetate. Four groups of comparable animals were fed a basal controlled diet and three levels of polyvinyl acetate respectively, namely 0.5%, 2.0% and 5%, in their diet. The growth and development of the animals fed the test material over an eight week period was not significantly different than that from the group fed the normal diet and it may be concluded that the polyvinyl acetate is a safe ingredient for inclusion in vitamin tablets.

Similar detailed experiments have been conducted from the standpoint of stability, availability and toxicity of tablets prepared using a wide variety of plastic or resinous film-forming material. When myrrh, styrax, "Durite" (a phenol-formaldehyde resin), "Catalin" (a melamine-formaldehyde resin), and "Glyptal" (a polybasic alcohol-polybasic acid resin) were substituted for polyvinyl acetate in coating vitamin $B_1$ and vitamin C, the following stabilities were obtained on an uncoated tablet:

essential, however, to the formation of the granulations nor to the stabilization of the vitamins. For example, any of the water-soluble vitamins may be mixed with a solution of polyvinyl acetate or other plastic in alcohol. Since some of the vitamins are quite soluble in alcohol they may disssolve. This solution may be drum dried, preferably under a vacuum so as not to require too high a temperature, to form extremely thin sheets of film of the plastic in which the vitamin is embedded. This thin sheet material may be put through an oscillating granulator and broken up into fine discrete granules of any size depending on the adjustment of the granulator. The granules may be sieved and the fines reprocessed if uniformly sized particles are desired. These granules may be used in any of the ways suggested herein. A small amount of a calcium salt may be included in the solution, for example an amount about equal to the vitamin. This does not alter the consistency of the solution materially and assists in forming a friable film.

In the above described illustrative embodiments, the coated vitamins are stamped in a compact tablet inasmuch as this is one of the most convenient forms for marketing them. However, the granulations which contain only the vitamin in the coating material, or the coated vitamins granulated with a calcium salt, may be admixed with granular or powdered products, such as dehydrated soups, dried milk concentrates and other food products or ingredients.

Table X

| | Myrrh | | Styrax | | Durite | | Alkylurea resin | | Glyptal | |
|---|---|---|---|---|---|---|---|---|---|---|
| | Vitamin $B_1$ in mg. | Vitamin C in mg. | Vitamin $B_1$ in mg. | Vitamin C in mg. | Vitamin $B_1$ in mg. | Vitamin C in mg. | Vitamin $B_1$ in mg. | Vitamin C in mg. | Vitamin $B_1$ in mg. | Vitamin C in mg. |
| Preliminary assay | 0.40 | 10.4 | 0.41 | 10.4 | 0.41 | 9.9 | 0.42 | 10.4 | 0.48 | 11.4 |
| 1st week at 42° C | 0.41 | 10.0 | 0.41 | 10.3 | 0.40 | 9.5 | 0.39 | 10.1 | 0.49 | 12.1 |
| 2d week | 0.41 | 10.0 | 0.41 | 9.8 | 0.40 | 9.6 | 0.38 | 10.2 | 0.53 | 11.5 |
| 3d week | 0.41 | 10.1 | 0.41 | 10.0 | 0.37 | 9.5 | 0.38 | 10.2 | 0.46 | 11.6 |
| 5th week | 0.37 | 10.4 | 0.38 | 9.6 | 0.33 | 9.1 | 0.34 | 10.0 | 0.46 | 11.6 |
| 8th week | 0.38 | 10.1 | 0.37 | 9.7 | 0.41 | 8.9 | 0.39 | 9.9 | 0.43 | 11.5 |
| Percentage retained after 8 wks | 95 | 97 | 90 | 93 | 100 | 90 | 93 | 95 | 90 | 100 |

The data in the above tables listed heretofore is typical of the results obtained with many resins, and indicates that vitamins are retained in at least 90% of their original quantity after a shelf life of about a year. This requires not more than a 10% overage to assure the claimed potency under normal conditions of distribution.

In the above illustrative examples the coated vitamins are included in a granulation containing a large amount of a calcium salt. This embodiment is described because it is one way of including a large amount of calcium and phosphorus in a finished tablet. The inclusion of a salt is not They are admirably suited also for use in animal feeds. Extensive research and analysis in connection with dehydrated soups, for example, fortified with coated vitamin granulations of the type described herein, showed that the soups retain their added vitamin content when subjected to accelerated aging conditions. This demonstrates that the granulations need not be compacted nor stamped in order for the coating to act sufficiently in stabilizing the vitamins. The stabilization provided by the coating is particularly noteworthy when the coated vitamins are added to dehydrated soups where the protein and hydroscopic agents in such finely divided material is such as normally to accelerate the deterioration of added vitamins which are not otherwise stabilized.

It will be apparent that my invention is subject to many obvious variations in procedure which will be reflected in the composition of the tablet, and that many equivalent materials may be substituted for a number of the ingredients disclosed. All such obvious variations and equivalent materials are to be included within the invention.

This application is a continuation-in-part of application Serial No. 414,607, filed October 11, 1941, and Serial No. 424,786, filed December 29, 1941.

I claim:

1. A substantially homogeneous edible composition containing both mineral and vitamin nutrient components, comprising at least one water-soluble vitamin normally deteriorative and incompatible with minerals, individual particles of which are protected with a moisture and air resistant film-forming water-insoluble plastic inert with respect to said vitamin and effecting a physical separation of said coated vitamin from said mineral and from any other components with which said vitamin is incompatible, said plastic being permeable to digestive fluids so that the coated vitamins remain available for absorption in the digestive tract, said coated vitamin particles being a free-flowing uniform granulation compressible into tablets.

2. An edible composition containing both mineral and vitamin components in a single tablet stabilized against substantial loss of potency over a long period of time, comprising a mixture of mineral ingredients, oil-soluble vitamin ingredients, and water-soluble vitamin ingredients, individual particles of at least one of the water-soluble vitamin ingredients being separately provided with a coating of a film-forming water-insoluble plastic inert with respect to said vitamin, said coating being resistant to moisture and air and effecting a physical separation from other components with which the coated vitamin is incompatible, said plastic being permeable to digestive fluids so that the coated vitamins remain available for absorption in the intestinal tract, all of said mineral and vitamin ingredients being in uniform admixture formed into tablets coated with a film substantially impervious to air and moisture.

3. An edible composition containing both mineral and vitamin components in a single tablet stabilized against substantial loss of potency over a long period of time, comprising a mixture of mineral ingredients comprising compounds of iron, phosphorus and calcium, and vitamin ingredients comprising vitamin C, vitamin $B_1$, vitamin $B_2$, vitamin A and vitamin D, individual particles of said vitamin $B_1$ and vitamin C each being separately provided with a coating of a film-forming water-insoluble plastic inert with respect thereto, said coating being resistant to moisture and air and effecting a physical separation from other components with which the coated vitamins are incompatible, said plastic being permeable to digestive fluids so that the coated vitamins remain available for absorption in the intestinal tract, all of said ingredients being in uniform free-flowing admixture formed into tablets coated with a film substantially impervious to air and moisture.

4. A method of making a substantially homogeneous edible composition containing both mineral and vitamin nutrient components, including mineral ingredients comprising compounds of iron, phosphorus and calcium, and vitamin ingredients comprising water-soluble vitamins normally deteriorative and incompatible with a mineral component, which comprises separately mixing vitamin $B_1$ and vitamin C with a solution of a film-forming water-insoluble plastic dissolved in an organic solvent, distributing the coated vitamins in one of the mineral components, and evaporating the solvent to form a moisture and air resistant protective coating of the plastic upon individual particles of the vitamins separating them from mineral components with which they are incompatible and protecting them against deterioration due to air and moisture, said plastic nevertheless being permeable to digestive fluids so that the coated vitamins remain available for absorption in the digestive tract.

5. A method of making a substantially homogeneous edible composition containing both mineral and vitamin nutrient components in a single tablet, comprising at least one water-soluble vitamin normally deteriorative and incompatible with a mineral component, which comprises mixing the water-soluble vitamin with a solution of a film-forming water-insoluble plastic dissolved in an organic solvent, distributing the coated vitamin in a mineral component, and evaporating the solvent to form a granulation in which a moisture and air resistant protective coating of the plastic upon individual particles of the vitamin separates them from mineral components with which they are incompatible and protects them against deterioration due to air and moisture, said plastic nevertheless being permeable to digestive fluids so that the coated vitamins remain available for absorption in the digestive tract, mixing the granulation with an oil-soluble vitamin, stamping the granulation mixture into tablets, and coating the tablets with a film of plastic impervious to air and moisture.

6. A method of making a substantially homogeneous edible composition containing both mineral and vitamin nutrient components in a single tablet, including mineral ingredients comprising compounds of iron, calcium and phosphorus, and vitamin ingredients comprising oil-soluble vitamins and water-soluble vitamins normally deteriorative and incompatible with a mineral component which comprises separately mixing vitamin $B_1$ and vitamin C with a solution of a film-forming water-insoluble plastic dissolved in an organic solvent, distributing the coated vitamins in a calcium and phosphorus containing mineral component, and evaporating the solvent to form granulations in which a moisture and air resistant protective coating of the plastic upon individual particles of the vitamins separates them from mineral components with which they are incompatible and protects them against deterioration due to air and moisture, said plastic nevertheless being permeable to digestive fluids so that the coated vitamins remain available for absorption in the digestive tract, mixing the granulations with an oil-soluble vitamin, stamping the mixture of granulations into tablets, and coating the tablets with a film of plastic impervious to air and moisture.

7. A method of making a substantially homogeneous edible composition containing both mineral and vitamin nutrient components, comprising at least one water-soluble vitamin normally deteriorative and incompatible with a mineral component, which comprises mixing the water-soluble vitamin with a solution of a film-forming water-insoluble plastic dissolved in an organic solvent, distributing the coated vitamin in a mineral component, and evaporating the solvent to form a granulation in which a moisture and air resistant protective coating of the plastic upon individual particles of the vitamin separates them from mineral components with which they are incompatible and protects them against deteriorations due to air and moisture, said plastic nevertheless being permeable to digestive fluids so that the coated vitamins remain available for absorption in the digestive tract.

CARL N. ANDERSEN.